No. 643,748. Patented Feb. 20, 1900.
C. T. MEREDITH.
EDUCATIONAL CHART.
(Application filed Apr. 14, 1899.)
(No Model.)
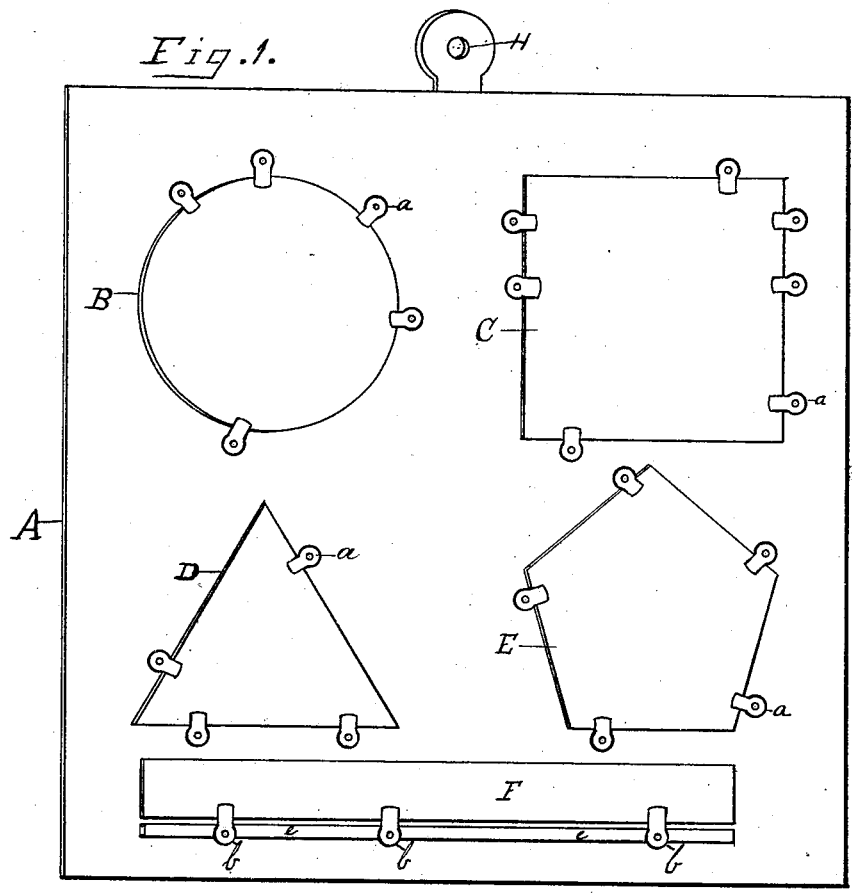
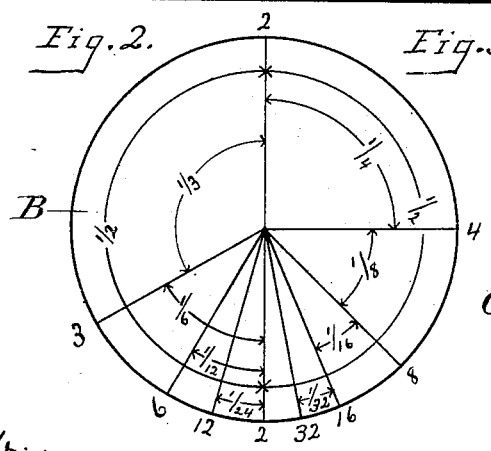
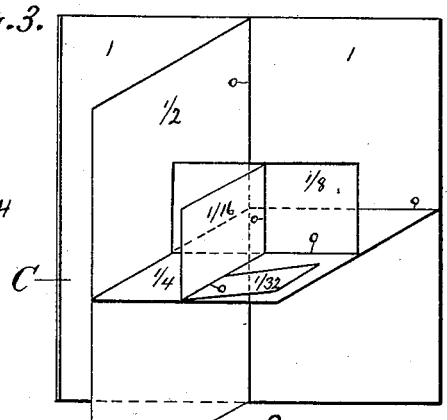
Witnesses
M. McGinnis
J. C. des Granges.
Inventor
Charles T. Meredith
By Hazard & Harpham
Attorneys

UNITED STATES PATENT OFFICE.

CHARLES T. MEREDITH, OF SAN DIEGO, CALIFORNIA.

EDUCATIONAL CHART.

SPECIFICATION forming part of Letters Patent No. 643,748, dated February 20, 1900.

Application filed April 14, 1899. Serial No. 713,065. (No model.)

*To all whom it may concern:*

Be it known that I, CHARLES T. MEREDITH, a citizen of the United States, residing at San Diego, in the county of San Diego and State of California, have invented a new and useful Educational Chart, of which the following is a full, clear, and exact description, reference being had to the accompanying drawings, which form part of the specification.

My invention relates to charts used for demonstrating to pupils the manner in which plane geometric figures may be subdivided; and the object thereof is to teach pupils by visual demonstration the relation that any aliquot part bears to the whole or any subdivision of such geometrical figure or unit.

My invention consists in the novel construction, arrangement, and combination of the parts hereinafter fully described and claimed; and it is embodied in a chart comprising a number of symbols representing a number of plane geometric figures or units, such as a circle, polygon, rectangle, &c. These symbols are made of paper, linen, or any suitable substance adapted to be folded and colored and are composed of leaves or folds, each leaf or fold representing a different aliquot part of the figure or unit, and are arranged on cardboard or other base, such as A, in substantially the manner shown in Figure 1. This base may be of any desirable size and may be held in the hand, leaving the other hand free to subdivide the figure, or it may for convenience be hung on the wall, an eyelet H being provided for that purpose. These symbols, representing units—such as B, C, D, E, and F—being, respectively, a circle, square, triangle, polygon, and rectangle, and comprise, first, the top leaf of stiff paper or the substance representing the figure or unit, then additional leaves or folds representing the aliquot parts into which such units may be divided, and these different folds or leaves are so arranged that any of them representing parts of such figure may be folded or turned over, displaying thereby a different subdivision of said unit. A different color should be given to each fold or leaf, that the relation and equivalence of the aliquot parts which they represent bear to the whole and to each other may be readily impressed on the mind of the pupil and more readily understood. To better illustrate the construction of these symbols and the manner of their use I have shown in Figs. 2 and 3 the circle, symbol B, and square, symbol C, subdivided into different parts. In Fig. 3 I have shown the leaves on the right half of the square, which represent different parts of the square. I have deemed it unnecessary to subdivide or show the leaves in more than one symbol, as the other symbols are constructed and subdivided substantially in like manner, and the description of these two will clearly explain all and the manner of their use.

The symbol B, Fig. 2, is arranged so that the circle may be subdivided into different aliquot parts by being folded or turned on and along the lines as indicated, these lines indicating where the various leaves or folds are pivotally attached and the point where they fold or turn. The letter B will represent the entire circle. All the subdivisions thereof should have a distinctive color. The line 2 bisects the circle, and by turning to the left along line 2 the leaf which is on the right two halves will be exposed. Then by folding the leaf lying to the right of line 2 along or on line 4 two quarters on the right will be exposed. Now by folding the quarter lying between 4 and 2 on the line 8 two eighths will be exposed. Then by folding the eighth lying between 8 and 2 and on the line 16 two sixteenths will be exposed, and by further folding the sixteenth part lying between 16 and 2 on line 32 two thirty-seconds will be exposed, and this subdivision may be continued down as desirable, consistent with practicability, depending, of course, upon the size of the symbol employed. The circle may be further subdivided as follows: Turn to the right the leaf on the left representing half the circle along or on line 2 and leave exposed thereby the left one-half. Now turn down and to the right that part of the left half lying between lines 2 and 3 on line 3, and the circle will be divided into thirds. The parts lying between lines 3 and 2 may be divided by folding along or on line 6, exposing two twelfths. The part lying between lines 2 and 6 may be divided into twenty-fourths by folding same on line 12, and so on within practical limits. In Fig. 3 I have shown the leaves or folds representing the different aliquot parts of the square in an open position, and the part which each leaf or fold represents being indicated on the fold in fractional figures. The letter O designates the line where the leaf on which it is marked is pivotally attached and on which the leaf is turned.

The leaves or folds of the various symbols when turned are kept in place by the adjustable catches $a$. (Shown in Fig. 1.)

In symbol F, I have shown a button $b$, (instead of catches,) slidably mounted on the rib or bearing $e$, which is mounted on the base A. This manner of holding the leaves is better adapted for use along straight lines. In each of these symbols the outside leaf represents the entire figure or unit, and by folding this leaf along certain lines, for which provision is made, different subdivisions of the figure or unit will be exposed. Then leaves representing other subdivisions of the unit (not susceptible of being shown on the unit-leaf) are placed under the unit-leaf. The unit-leaf or subdivision-leaves are held in place where required by the catches or buttons, as shown, the outlines of the figure or unit remaining intact, no matter into how many parts the unit may be subdivided with different colors thereon.

What I claim as new, and desire to secure by Letters Patent, is—

1. The educational chart herein described, comprising a number of symbols, mounted on a common base, representing different plane geometric figures, each symbol being composed of a number of leaves, one, outer, leaf representing the geometric figure or unit, and the other subdivisional leaves lying thereunder representing aliquot parts of such unit or figure, each subdivisional leaf having a distinctive color and arranged to fold in a manner to expose the different leaves representing different aliquot parts of said figure, leaving intact the outlines of the original figure or unit, no matter into what parts the subdivisional leaves may have divided it.

2. The herein-described educational chart, comprising base A, having symbols as B, C, D, E, and F mounted thereon and representing different plane geometric figures, the said symbols being composed of leaves as one, one-half, one-fourth, one-eighth, one-sixteenth, and one thirty-second, representing such figure and aliquot parts thereof, adapted to be opened and closed, within the outlines of the unit, as desired; and the catches $a$ for holding the leaves in position, substantially as shown and described.

3. An educational chart for illustrating the manner of subdividing the unit into fractional parts, comprising the main body portion or base A, having mounted thereon symbols representing different geometric figures, these symbols being composed of a plurality of leaves, the outer leaf representing the geometric figure or unit, and the other leaves lying between it and the base representing fractional parts thereof; the area of each inner leaf being an aliquot part of the whole, and arranged in different colors, and adapted to be folded so as to disclose these subdivisional leaves, representing aliquot parts of the unit or whole.

4. An educational chart comprising a number of geometric figures disposed on a main body portion or base, each figure being represented by an outer leaf in shape a geometric figure or unit designed to be represented, and a plurality of smaller leaves lying thereunder having the shape and area of aliquot parts of the outer leaf or unit, each of said inner leaves having a distinctive color, all being collapsibly attached together and adapted when folded or closed to represent the geometric figure or unit and when unfolded or opened out to display different fractional parts of the figure or unit in different colors, substantially as shown and described.

In witness that I claim the foregoing I have hereunto subscribed my name, this 6th day of April, 1899, at San Diego, California.

CHARLES T. MEREDITH.

Witnesses:
F. F. FYLER,
S. W. KROFF.